United States Patent
Schneiderheinze

(10) Patent No.: US 7,080,534 B2
(45) Date of Patent: Jul. 25, 2006

(54) SAFETY APPARATUS FOR A MACHINE, IN PARTICULAR FOR A PRESS BRAKE

(75) Inventor: Dirk Schneiderheinze, Glen Forrest WA (AU)

(73) Assignee: Pilz GmbH & Co., Ostfildern (DE)

( * ) Notice: Subject to any disclaimer, the term of this patent is extended or adjusted under 35 U.S.C. 154(b) by 0 days.

(21) Appl. No.: 11/113,422

(22) Filed: Apr. 22, 2005

(65) Prior Publication Data
US 2005/0247102 A1 Nov. 10, 2005

Related U.S. Application Data

(63) Continuation of application No. PCT/EP03/11170, filed on Oct. 9, 2003.

(30) Foreign Application Priority Data
Nov. 5, 2002 (DE) ............ 202 17 426 U

(51) Int. Cl.
G01D 21/04 (2006.01)
F16P 3/14 (2006.01)
B21D 55/00 (2006.01)
F16D 13/14 (2006.01)

(52) U.S. Cl. .............. 72/21.3; 72/389.3; 100/342; 100/348; 192/130; 340/555

(58) Field of Classification Search ............. 72/20.2, 72/21.3, 389.3; 100/342, 348; 192/129 A, 192/130; 340/555
See application file for complete search history.

(56) References Cited

U.S. PATENT DOCUMENTS

| | | | |
|---|---|---|---|
| 4,166,369 A | 9/1979 | Nakajima | |
| 4,249,074 A * | 2/1981 | Zettler et al. | 250/221 |
| 4,660,703 A * | 4/1987 | Filcich et al. | 192/130 |
| 5,579,884 A | 12/1996 | Appleyard et al. | |
| 6,316,763 B1 * | 11/2001 | Appleyard et al. | 250/221 |
| 6,660,993 B1 * | 12/2003 | Appleyard et al. | 250/221 |
| 6,752,253 B1 * | 6/2004 | Fiessler | 192/130 |
| 6,919,555 B1 * | 7/2005 | Fiessler | 100/348 |
| 2002/0104958 A1 | 8/2002 | Fiessler | |

(Continued)

FOREIGN PATENT DOCUMENTS

DE 852 037 10/1952

(Continued)

*Primary Examiner*—David Jones
(74) *Attorney, Agent, or Firm*—Harness, Dickey & Pierce, P.L.C.

(57) ABSTRACT

The present invention relates to a safety apparatus for a machine such as a press brake. The machine has a first and a second machine part which perform a working movement towards each other. The first machine part has a leading edge in the direction of movement, and the leading edge defines a plane of movement. The safety apparatus has a plurality of first light barriers which run with the first machine part during the working movement, with the light beams of the first light barriers extending parallel to the plane of movement and being distributed in the region of the plane of movement in such a way that they run in advance of the leading edge with an increasing distance as viewed in the direction of the working movement. Furthermore, there is a control unit which stops the working movement in response to the first light barriers. There is also a configuration device, by means of which selected ones from the first light barriers can be deactivated at least for the duration of the working movement.

20 Claims, 4 Drawing Sheets

U.S. PATENT DOCUMENTS

2003/0132371 A1    7/2003    Fiessler

FOREIGN PATENT DOCUMENTS

| DE | 27 50 234 | 1/1979 |
| DE | 196 04 900 A1 | 8/1997 |
| DE | 197 17 299 A1 | 2/1998 |
| DE | 100 27 156 A1 | 12/2001 |
| EP | 1 319 886 A2 | 6/2003 |
| WO | 97/25568 | 7/1997 |
| WO | 00/67932 | 11/2000 |

* cited by examiner

SAFETY APPARATUS FOR A MACHINE, IN PARTICULAR FOR A PRESS BRAKE

CROSS-REFERENCES TO RELATED APPLICATIONS

This application is a continuation of co-pending international patent application PCT/EP2003/011170 filed on Oct. 9, 2003 and published in German language, which claims priority under the Paris convention from German utility model application DE 202 17 426.3.

BACKGROUND OF THE INVENTION

The invention relates to a safety apparatus for a machine, in which a first machine part performs a working movement towards a second machine part, such as in the case of a press brake.

A known method for non-cutting processing of workpieces is bending or folding. In this case, a workpiece, which is still flat within a region of the processing point at the beginning, is formed under pressure. Used for this purpose during the machine assisted processing are machines which are generally referred to as press brakes in the following. However, the invention is not limited to press brakes in the narrower sense and can likewise be used in folding presses, punching machines, cutting machines and any other kind of machines in which two machine parts perform a hazardous working movement towards one another.

In a press brake, the workpiece is essentially formed by being pressed with a punch against a die. The desired shaping can be achieved by appropriate design of the punch and the die. The punch is often a tool that is arranged on a first, movable machine part, whereas the die sits on a second, fixed machine part. However, since it is only the relative movement of the two machine parts that is the important factor, the die may alternatively also be moved or both machine parts may be moved towards one another. The safety apparatus according to the invention can be used in all of these cases.

It will be readily understood that a press brake poses a considerable risk to the operating personnel, in particular the risk of crushing or even of the risk severing of body parts. Accordingly, it has already been known for a long time to provide press brakes and the like with a safety apparatus in order to avoid accidents as far as possible. For example, a light-grid protection device for a press brake is described in German Patent 852 027, wherein a light-grid protection device with a plurality of individual light beams is arranged in such a way that it moves downwards with the hazardous movement of the first machine part. If one of the light beams is interrupted, the movement of the first machine part is stopped. The light beams of the light grid run in front of and behind the actual working region, i.e. The light grid descends in parallel with the working movement of the first machine part like a type of protective curtain in front of the operator of the machine.

U.S. Pat. No. 5,579,884 discloses a light barrier arrangement in which two or three light beams run parallel to the leading edge of the punch and in advance of the latter. If one of the light beams is interrupted, the movement of the punch stops. If there are only two light beams, they run so as to be offset symmetrically forwards (towards the operator side) and rearward (towards the side remote from the operator). The same applies if three light beams are used, with the third light beam then being arranged exactly below the leading edge of the punch and with a greater advance than the other two light beams. In the arrangement according to U.S. Pat. No. 5,579,884, the third light beam primarily serves as a control beam, which prevents a "muting point" from being set too deep. The muting point determines a point in the sequence of movement of the punch from which the light beams of the safety apparatus are deactivated for a short time period. This is because the actual processing operation could not be completed without such a short deactivation, since the punch is otherwise always stopped when the workpiece to be processed interrupts the light beams.

In a further exemplary embodiment of U.S. Pat. No. 5,579,884, a light grid is provided between the operator and the moving punch in addition to the three light beams mentioned before. This arrangement is specifically provided for the case where the punch has various regions which project to a varying extent in the direction of movement. The light grid is intended to prevent an operator from being able to intrude in a "shorter" section of the punch once the three above mentioned light beams have been deactivated, because a "longer" region of the punch has crossed the muting point.

DE 100 27 156 A1 discloses a safety apparatus for folding presses and the like in which the light beams are deactivated as a function of the speed of the working movement. This known light barrier arrangement contains two or three light beams which essentially run below the leading edge of the punch. A first light beam runs virtually at the level of and in the immediate vicinity of the leading edge, whereas two further light beams are at an increasing distance from the leading edge. In an exemplary embodiment, the light beams further in advance are deactivated one after the other, i.e. At different working positions of the punch.

DE 197 17 299 A1 discloses a safety apparatus having up to four light barriers, the light beam of a first light barrier running at the level of the leading edge of the punch and in the immediate vicinity thereof. The other three light beams form a light grid which is arranged with a certain advance relative to the punch and perpendicularly to the direction of movement, i.e. "horizontally". The topmost individual light beam serves to adjust the advance of the other light beams with regard to the leading edge of the punch.

WO 97/25568 and WO 00/67932 disclose similar arrangements in which a light grid or light curtain runs ahead of the punch and transversely to the direction of movement of the latter.

DE 27 50 234 discloses a safety apparatus having two light beams in which a first light beam runs ahead of the punch and parallel to the leading edge of the latter, whereas a second light beam is arranged in parallel in the region of the fixed die.

In a safety apparatus according to U.S. Pat. No. 4,166,369, three light beams run with increasing distance in advance of the leading edge of the punch, these light beams being briefly deactivated (muted) one after the other as a function of the respective punch positions reached.

Finally, DE 196 04 900 A1 discloses a safety apparatus in which a plurality of light beams are arranged parallel to the direction of movement of the punch. In contrast to the numerous other examples, however, these light beams do not run with the movement of the punch. Rather, the punch passes through the light grid of the light beams, and a control device deactivates the individual light beams as a function of preset control data records (muting).

Thus, a plurality of the safety apparatuses for press brakes and the like are already known in which light barriers are used in order to detect an intrusion of an operator in the hazardous working region and in order to stop the working movement if necessary. A common feature of all the known arrangements is that the respective light barrier arrangements have to be adapted very exactly to the individual machine, a factor which is quite expensive. In particular the advance of the individual light beams relative to the leading edge of the punch is a critical variable, which in each case has to be matched very precisely to the machine to be protected. Consequently, a considerable outlay is required by the manufacturer and distributor of the known safety apparatuses in order to provide suitable safety apparatuses for various types of press brakes and the like. Only the arrangement disclosed by DE 196 04 900 C2 has a certain flexibility, since adaptation to various machines is possible by corresponding programming of the control device. However, this programming may be very time consuming in an individual case. In addition, this known safety apparatus is based on a fundamentally different concept compared to the other safety apparatuses described before, since the light barriers here, in contrast to the other cases, are arranged in a fixed position.

SUMMARY OF THE INVENTION

In view of the above, it is an object of the present invention to provide for a safety apparatus that can be easily adapted to various press brakes.

It is another object of the invention to provide for a safety apparatus that requires reduced outlay on the side of the manufacturer and distributor of the safety apparatus.

It is yet another object to provide a machine installation that takes benefit from an easy and quick adaptation of a safety apparatus for protection against hazardous machine movements.

According to one aspect of the invention, these and other objects are achieved by a safety apparatus of the type mentioned at the beginning, comprising a plurality of first light barriers which run with the first machine part during the working movement, wherein light beams of the first light barriers extend parallel to the plane of movement and are preferably distributed in the region of the plane of movement in such a way that they run in advance of the leading edge with increasing distance as viewed in the direction of the working movement, comprising a control unit which stops the working movement of the first machine part in response to the first light barriers, and comprising a configuration device, by means of which selected first light barriers can be deactivated at least for the duration of the working movement.

According to another aspect of the invention, these and other objects are addressed by a machine installation comprising a safety apparatus of the aforementioned kind.

The new safety apparatus and the new machine installation follow the concept of light barriers running with a moving machine part (e.g. The punch in the case of a press brake), which is also mainly preferred in the prior art. This allows a relative small number of barriers to be used, as a result of which the material rial costs are reduced. In contrast to most known safety apparatuses, however, the safety apparatus according to the invention may have "too many" light barriers, depending on the machine where it is used, and, accordingly, some of the light barriers can be deactivated at least for the duration of the working movement. By means of the configuration device, which in a preferred exemplary embodiment of the invention permits computer-based parameterization, the light barriers not required for a particular machine can be deactivated. It may be pointed out that this type of deactivation does not involve the muting described above, which deactivates the light barriers only for a small portion of the total working movement. Here, according to the invention, the light barriers that are not required are deactivated for the entire duration of the working movement, preferably even permanently.

Since there are a plurality of first light barriers at an increasing distance from the leading edge, the safety apparatus can be adapted in an especially simple manner to varying overtravel of the first machine part. The overtravel indicates the distance which the first machine part still moves forward up to the final stoppage after a stop command is given, i.e. In other words, it is some sort of a braking distance including reaction time. Machines working at very high speed have a greater overtravel and therefore require light barriers at a relatively large distance from the leading edge. In machines working at low speed, however, too large a distance of the light barriers from the leading edge would be disadvantageous, since the muting which is still required would be affected earlier than desired. In previous safety apparatuses, it was thus necessary to adjust the advance of the light barriers in such a way that it was matched to the individual machine speed. Accordingly, the outlay was increased in safety apparatuses having a plurality of light barriers. For some machine types, the manufacturer of a safety apparatus even had to provide individual solutions in order to permit the appropriate mounting on the machine. This outlay is now considerably reduced by the inventive provision of light barriers which can be specifically selected.

In a preferred refinement, the configuration device is designed in such a way that the first light barriers can be deactivated only in the reverse sequence of their distances from the leading edge.

This inevitably leads to the result that all the first light barriers whose distance from the leading edge is the same as or smaller than required in view of the overtravel are activated. As a result, additional protection against intrusion is achieved in a cost-effective and reliable manner. However, due to the plurality of first light barriers, which can be specifically selected, this additional protection does not involve an additional outlay in terms of production and/or adaptation.

In a further refinement, a plurality of second light barriers are provided, the light beams of which spread out a light grid which lies to one side of the plane of movement but essentially parallel thereto.

The second light barriers are thus not located directly in the path of movement of the first machine part but are laterally offset therefrom, preferably towards the operator side. As an alternative and/or in addition to the preceding refinement, this measure permits simple and effective protection against intrusion in the direction of the working movement of the first machine part.

In a further refinement, the second light barriers run with the first machine part during the working movement.

In this refinement, the selected basic concept of the light barriers running with the first machine part is logically continued. As a result, effective protection against deliberate and/or unintentional intrusion is possible with a relatively small number of second light barriers. Furthermore, the optimal integration of the second light barriers in the safety system is simplified, since they can be fitted together with the first light barriers by the manufacturer.

In a further refinement, selected second light barriers can also be deactivated by means of the configuration device, at least for the duration of the working movement.

This measure permits even better adaptation of the basic model of a safety apparatus to the special conditions of a particular machine. In particular, undesirable "false alarms" can be effectively reduced in this way.

In a further refinement, only those second light barriers which run in advance of a non-deactivated first light barrier as viewed in the direction of the working movement can be deactivated in each case.

In other words, this measure achieves the effect that all the second light barriers which, as viewed in the direction of movement, lie behind the first light barrier running furthest in advance are activated when the machine is working. As a result, the protection against intrusion is ensured in an especially reliable manner, since a possibly undesirable incorrect des election of second light barriers is prevented.

In a further refinement, the plurality of second light barriers includes at least one second light barrier which trails behind the leading edge as viewed in the direction of the working movement.

The protection against intentional or unintentional intrusion is also improved by this measure, since the light grid of the second light barriers therefore covers the entire region starting from the leading edge up to the leading first light barrier.

In a further refinement, there are at least four first light barriers, the light beams of which run at a distance of about 5 mm, about 9 mm, about 15 mm and about 21 mm from the leading edge.

The number of four light barriers and the specified distances from the leading edge have proved to be especially advantageous in order to achieve sufficient flexibility with as small an expenditure as possible, this flexibility permitting protection in a plurality of press brakes. The specified distances are in particular suitable in a very effective manner for ensuring adequate protection in existing and future press brakes.

In a further preferred refinement, the configuration device has a part for determining overtravel of the first machine part, and the first light barriers can be deactivated only as a function of the overtravel.

By means of this measure, the free configurability of the light barrier arrangement is restricted in favour of increased safety against incorrect settings. It has been found that the overtravel of the machine to be protected constitutes a particular critical variable, and the first light barriers are to be selected and (de)activated in the optimum case in such a way that precisely one light barrier is further away from the leading edge than the existing overtravel. The preferred refinement takes this into account in that the first and possibly also the second light barriers can be selected only as a function of the actual overtravel. In this case, both the unintentional deactivation of an advantageously required light barrier and the unintentional activation of a light barrier actually not required are avoided.

In an especially preferred exemplary embodiment, the part for determining the overtravel comprises an automatic system which is preferably controlled by the control unit and with which the actual overtravel of the machine to be protected is determined at least once during the configuration of the safety apparatus. This can be done in a simple manner by the control device initiating one or more test runs within the course of the configuration of the safety apparatus, during which test runs the current overtravel is determined. As a result, an especially reliable and safe-to-operate configuration is possible.

Alternatively, however, the part for determining the overtravel may also essentially comprise a parameter input in which the overtravel of the machine to be protected is read in as a parameter. This alternative requires less outlay to realize the configuration device in practice.

It goes without saying that the abovementioned features and the features still to be explained below can be used not only in the respectively specified combination but also in other combinations or on their own without departing from the scope of the present invention.

BRIEF DESCRIPTION OF THE DRAWINGS

Exemplary embodiments of the invention are shown in the drawing and are described in more detail below. In the drawing.

DESCRIPTION OF PREFERRED EMBODIMENTS

Figure 1:
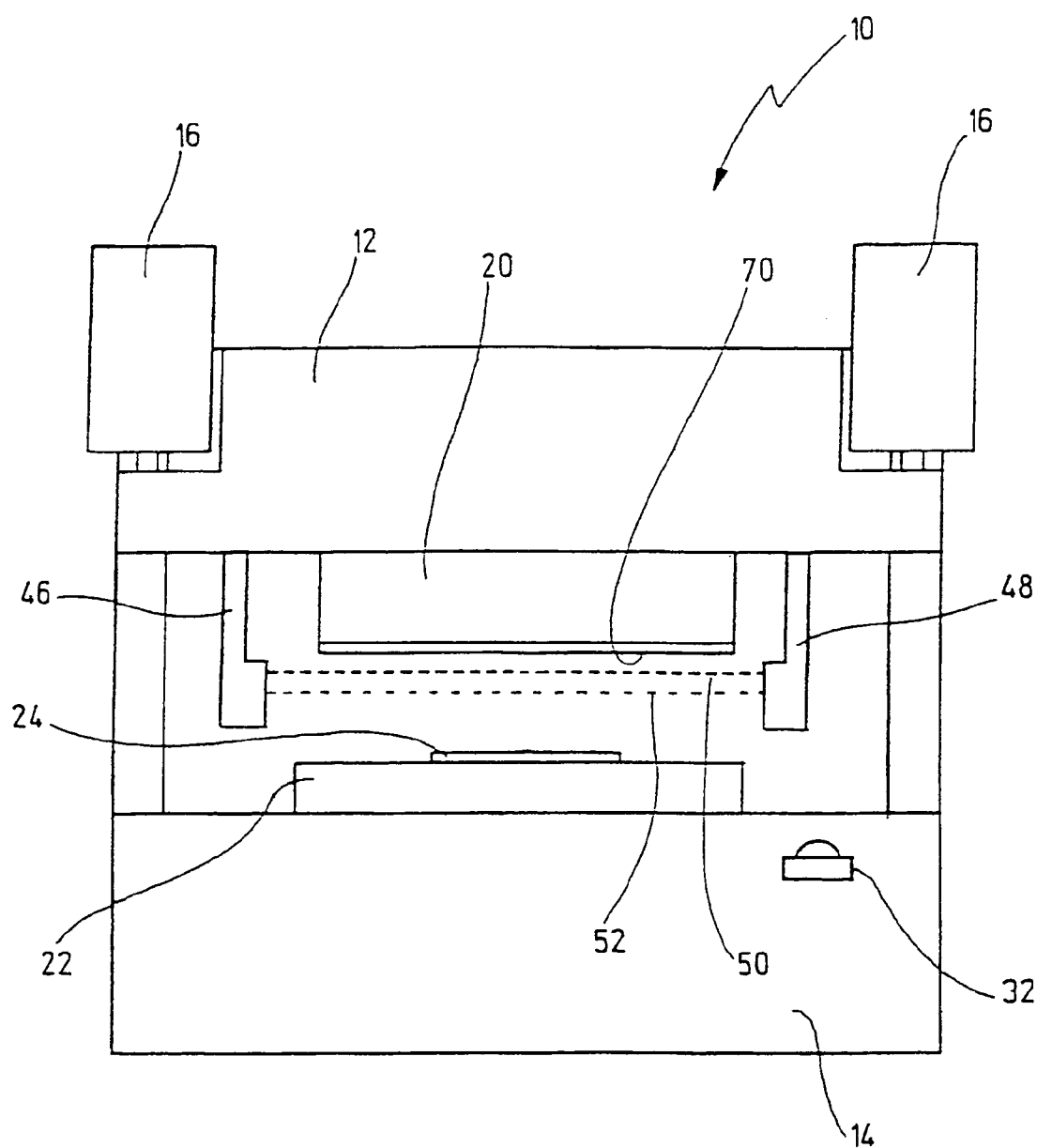
FIG. 1 shows a schematic illustration of a press brake having a safety apparatus according to the invention.
Figure 1:
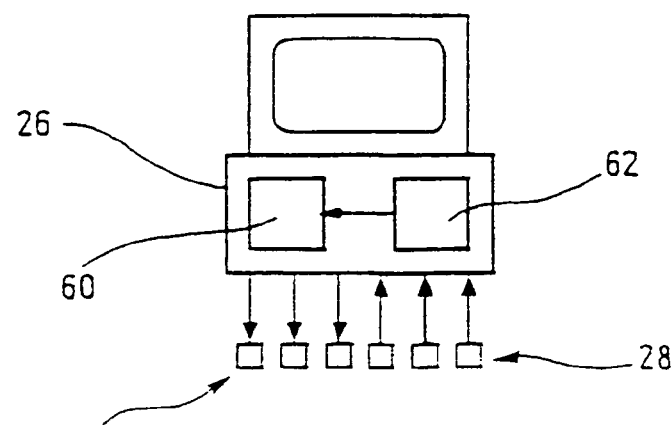
Figure 2:
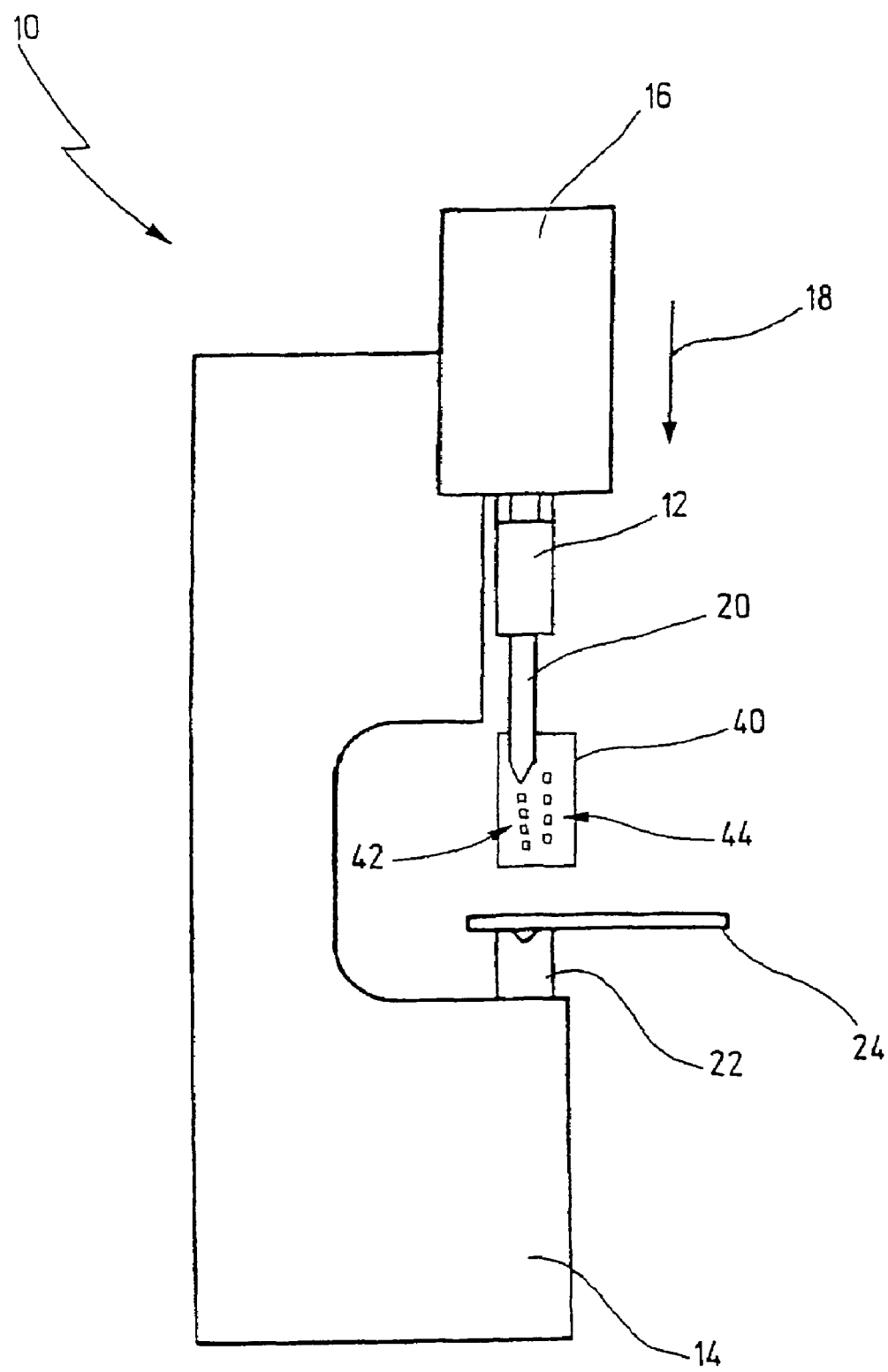
FIG. 2 shows the press brake from FIG. 1 in a side view.

A press brake having a safety apparatus according to the invention is designated overall by reference numeral 10 in FIGS. 1 and 2. As it is commonly known, the press brake 10 has a first machine part 12 (the upper machine part in this case) and a second machine part 14 (the lower machine part in this case). The upper machine part 12 can perform a working movement in the direction of an arrow 18 via a drive, which is indicated here schematically by reference numeral 16.

A punch 20 is arranged on the upper machine part 12. A die 22 is located on the lower machine part 14. The punch 20 and the die 22 together form the pressing tool with which a workpiece 24 can be formed. Here, for example, the workpiece 24 is a sheet-metal part.

Designated by reference numeral 26 is a control unit which, in a manner known per se, receives sensor signals 28 from various sensors of the press brake 10 and, as a function thereof, generates control signals 30 for controlling the working movement 18 and other processes. In a manner known per se, the control signals 30 control actuators, such as drive 16 for example.

Also indicated here by reference numeral 32 is an emergency stop switch, the switching position of which is likewise evaluated by the control unit 26.

Designated in FIG. 2 by the reference numeral 40 is a detector arrangement which is an integral part of the novel safety apparatus. The detector arrangement 40 comprises first light barriers 42 and second light barriers 44, which are in each case arranged one below the other in lines, the two lines 42, 44 in each case extending approximately parallel to the working movement 18.

The first light barriers 42 here are arranged directly in the path of movement of the punch 20 and at an increasing distance from the latter, whereas the second light barriers 44 are laterally offset from the path of movement of the punch 20. In other words, the light grid which is spread out by the second light barriers 44 is in this case offset from the path of movement of the punch towards the operator side of the press brake 10.

In a manner known per se, the first and second light barriers comprise light transmitters, preferably in the form of laser diodes and/or infrared diodes, and light receivers, with which the impingement of a laser or infrared beam can be detected. In the exemplary embodiment shown here, the light transmitters are combined to form a transmitter arrangement 46 and the light receivers are combined to form a receiver arrangement 48, as shown in FIG. 1. The transmitter and receiver arrangements 46, 48 are connected to the moving machine part 12 via suitable mounting parts, so that the light barriers 42, 44 move along with the punch 20. By way of example, two light beams 50, 52 of the first light barriers 42 are shown in FIG. 1.

The transmitter and receiver arrangements 46, 48 are connected to the control unit 26 via corresponding signal lines (not shown here for the sake of clarity). In other words, the control signals 30 include, inter alias, signals for switching on the light transmitters in the transmitter arrangement 46. Likewise, the sensor signals 28 comprise output signals of the light receivers in the receiver arrangement 48. The control unit 26 can therefore detect the interruption of a light beam 50, 52 of the light barriers 42, 44 and stop the working movement 18 of the machine part 12 as a function of the sensor signals 28 otherwise present. The working movement 18 is stopped in particular when the control unit 26 determines that one of the light beams 50, 52 is interrupted at an instant at which an interruption ought not to have occurred during a proper operating sequence. In practice, this may happen, for example, due to the operator of the press brake 10 inadvertently intruding in the path of movement of the punch 20.

According to a preferred exemplary embodiment, the control unit 26 here is what is known as a PAC (programmable logic controller), which, by suitable measures, such as a redundant, diverse design, is approved for controlling processes which are critical with regard to safety. Corresponding PLUS are commercially offered, for example, by the assignee of the present invention.

Most of the actual control functionality is realized in a PAC by suitable programming. In the preferred exemplary embodiment described here, this programming also contains two program modules 60, 62, which in the illustration in FIG. 1 are shown as schematic blocks within the control unit 26. The program module 60 provides a parameterization function, with which, when setting up the press brake 10, the requisite light barriers 42, 44 are selected (activated or deactivated) inter alias. The program module 62 permits automated determination of the current overtravel of the press brake 10 in a setting-up or test mode. The current overtravel determined is transferred as a parameter to the program module 60 and is taken into account as a necessary criterion when selecting the light barriers 42, 44. Therefore, program modules 60, 62 together are integral parts of a "configuration device", with which the light barriers 42, 44 can be specifically selected individually.

Figure 3:
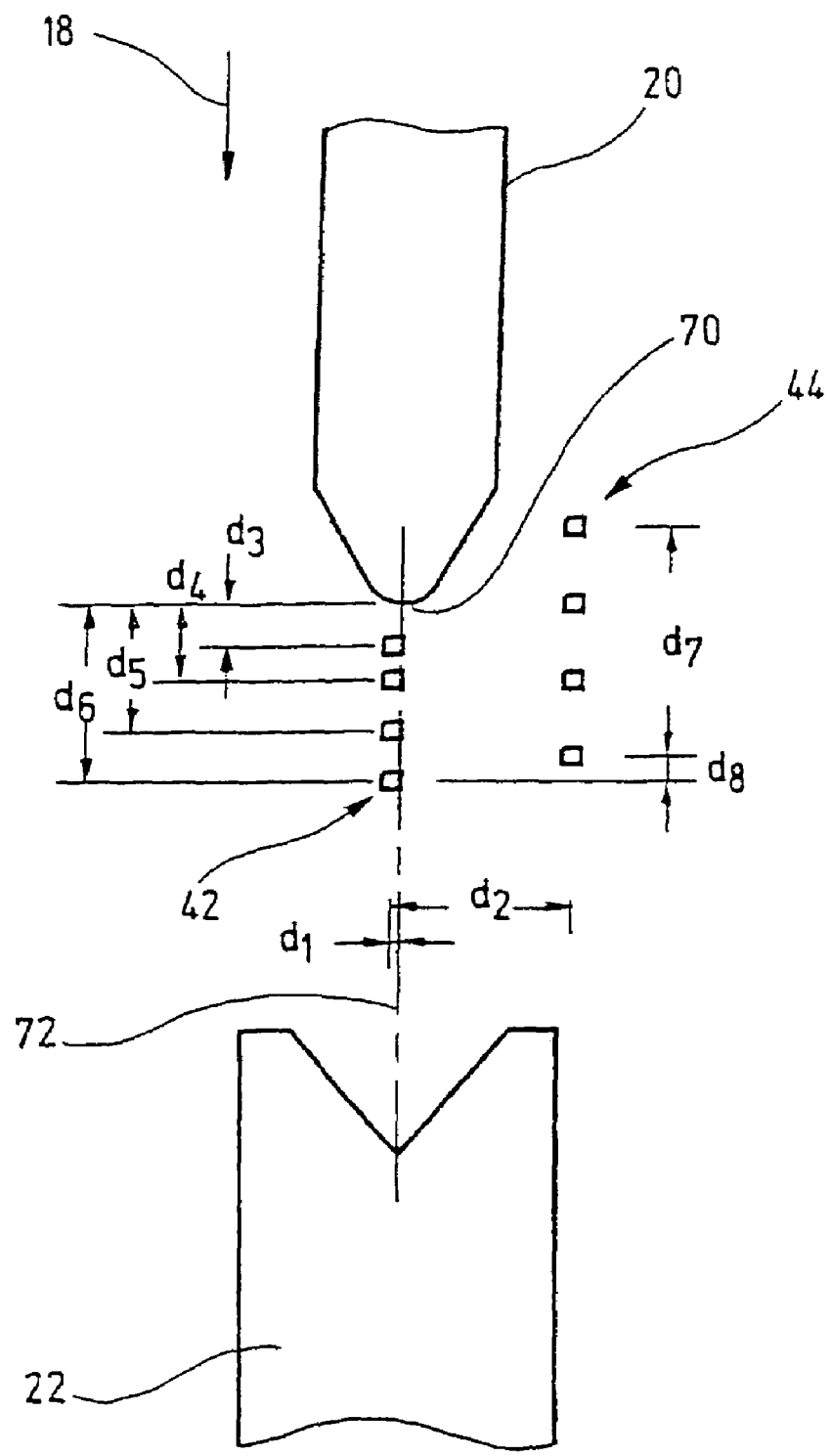
FIG. 3 shows the arrangement of the light beams in an especially preferred exemplary embodiment of a safety apparatus according to the invention.
Figure 4:
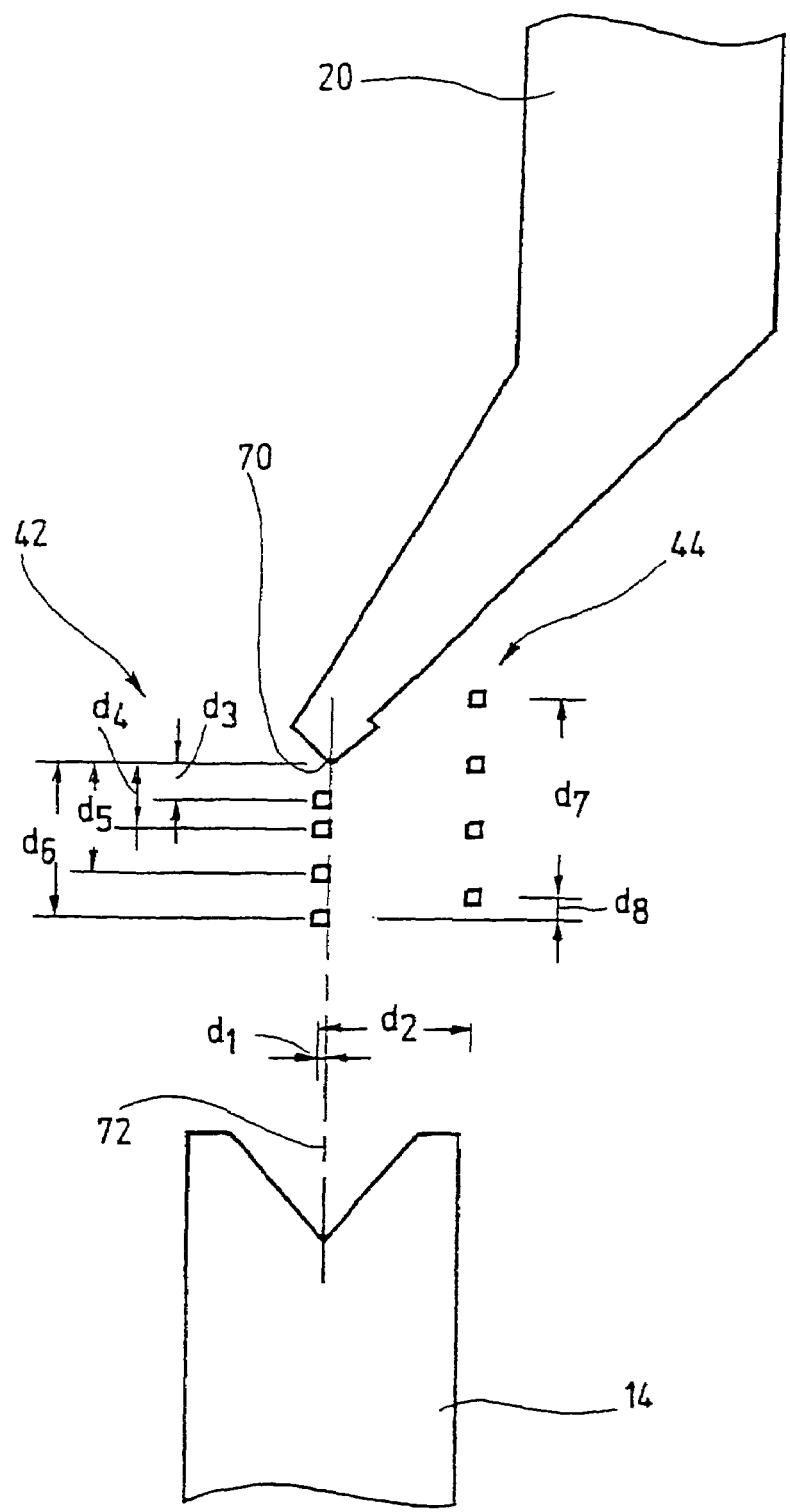
FIG. 4 shows the preferred safety apparatus in an alternative bending tool.

Details of the selection according to the invention are described below with reference to an especially preferred exemplary embodiment which is shown in FIGS. 3 and 4 in combination with two different punches 20. Same reference numerals designate the same elements as in the preceding figures.

In all cases, the punch 20 has a leading edge as viewed in the direction of the working movement 18, this edge or contour being designated by reference numeral 70 here. In this connection, this generally refers to the respective "foremost" region of the punch 20, which, however, may be of varying design depending on the application. Shown in FIG. 3 is an exemplary embodiment of a punch 20 having a more rounded edge 70, whereas the edge 70 in the exemplary embodiment according to FIG. 4 is a sharp edge.

Reference numeral 72 designates an (imaginary) plane of movement which the leading edge 70 describes due to the working movement 18 of the punch 20. The light barriers 42, 44 of the safety apparatus according to the invention are explained below with reference to this plane of movement and with reference to edge 70.

According to an especially preferred exemplary embodiment, the novel safety apparatus contains four first light barriers 42 and four second light barriers 44. Generally, however, a larger or smaller number of light barriers may also be used. In addition, in the safety apparatus according to the invention, the possibility of using further light barriers (not shown here), for example in order to protect a region on the rear side of the press brake 10, for adjusting purposes or for other reasons, is not ruled out.

The first light barriers 42 are arranged in a distributed manner in the region of plane 72 of movement, but with a slight offset $d_1$ of about 1 mm. The slight offset $d_1$ has advantages, in particular during the bending of boxes, since the number of false alarms due to a part of the workpiece 24 to be machined taking up position is reduced as a result. In principle, however, it is also possible to arrange the first light barriers 42 exactly on the plane 72 of movement, in front of the plane 72 of movement or even alternately in front of and behind the plane 72 of movement.

The second light barriers 44 are at a distance $d_2$ of, in this case, 20 mm from the plane of the first light barriers 42. This distance has proved to be advantageous during initial trials. However, if a minimum width of the die 14 of 20 mm is taken as a basis, it is also conceivable to increase the distance $d_2$ to 25 to 30 mm. With these distances, it is generally possible with this arrangement to also detect in good time the intrusion of a finger obliquely from below.

The distances of the individual first light barriers 42 from the edge 70 in this preferred exemplary embodiment are $d_3$=5 mm, $d_4$=9 mm, $d_5$=15 mm and $d_6$=21 mm. The distance $d_7$ between the two second light barriers 44 furthest away from one another is 27 mm. The second light barriers 44 are equipped, so that the distance between two adjacent second light barriers 44 is 9 mm in each case. Finally, the distance $d_8$ by which the foremost first light barrier 42 runs in advance of the foremost second light barrier 44 is $d_8$=3 mm. It goes without saying that these specifications may also be varied within the limits of the conventional tolerances and freedom of design.

It follows from the specified distances that the topmost second light barrier 44 trails behind the edge 70 as viewed in the direction of the working movement 18. Furthermore, the lowermost second light barrier 44 trails behind the lowermost first light barrier 42. By means of this arrangement, the second light barriers 44 provide good protection against intrusion in the movement of the punch 20 obliquely from above. At the same time, however, the actual processing operation remains largely unaffected by the second light barriers 44.

The configuration of the safety apparatus according to the invention, then, is as follows:

In a typical press brake 10, the first light barriers 42 at the distances $d_3$=5 mm and $d_4$=9 mm are activated, whereas the light barriers 42 at the distances $d_5$=15 mm and $d_6$=21 mm are deactivated. Furthermore, all the second light barriers 44 are activated whose light beams do not lie deeper than the deepest light beam of the first light barriers. In practice, therefore, the two top second light beams 44 are then active, whereas the two bottom second light beams 44 are deactivated. Such a configuration is readily suitable for a typical, standard press brake 10 with admissible overtravel of up to 7.5 mm. A corresponding mode of operation is shown by way of example in FIG. 1.

In high-speed presses, the first light barrier 42 is additionally activated at the distance $d_5=15$ mm, as a result of which overtravel of up to 13 mm is admissible. Furthermore, according to a preferred embodiment of the invention, the light barriers above it are each activated also in order to reliably detect intrusion from above. At the second light barriers 44, only the lowermost is deactivated.

In some press types of an especially cost-saving hydraulic system, the overtravel is even greater. In this case, all the first and second light barriers 42, 44 are used, overtravel of up to 19 mm then being admissible.

In presses working at an especially low speed, in particular those with small strokes, only the topmost first light barrier 42 at the distance of $d_3=5$ mm is advantageously used. As a result, overtravel of up to 3.5 mm can be protected. Of the second light barriers 44, only the two topmost are activated in this case.

On the whole, due to the novel arrangement of first and second light barriers 42, 44, very flexible adaptation of the safety apparatus to various press types and, if appropriate, also to various modes of operation of a press type is thus possible. The setting-up or resetting time is in this case relative short and the corresponding outlay small, since the corresponding activation and deactivation of the light barriers 42, 44 can be affected essentially solely via the control unit 26 and by means of the program modules 60, 62.

In so far as the activation and deactivation of the light barriers 42, 44 is referred to above in each case, it may be pointed out for the sake of completeness that this does not necessarily involve "switching-off" of the light barriers. Of course, the light barriers 42, 44 deactivated in each case may be switched off within the scope of the present invention. On the other hand, however, it is preferred if the light barriers deactivated in each case are nonetheless switched on, i.e. They produce a light beam 50, 52. Deactivation in this case therefore primarily means that the light barriers are not (any longer) evaluated with regard to an emergency stop for preventing accidents. However, the information from the "deactivated" light barriers may be evaluated for other purposes, for example for checking the position of the workpiece 24 on the die 14.

In deviation therefrom and in deviation from the preferred exemplary embodiment shown here, in which the configuration of the safety apparatus is affected "by software" by means of the program module 60, the configuration may also be affected in terms of hardware in other exemplary embodiments. In a simple exemplary embodiment, the light barriers not required in each case (the deactivated light barriers) are activated and deactivated, for example, by means of jumpers, selector switches and/or corresponding wiring.

What is claimed, is:

1. In a machine having a first machine part and a second machine part, with the first machine part and the second machine part performing a working movement towards each other, and with the first machine part having a leading edge in the direction of the working movement, the leading edge defining a plane of movement, a safety apparatus comprising:
   a plurality of first light barriers arranged for moving together with one of the machine parts during the working movement,
   a control unit, and
   a configuration device,
   wherein the first light barriers are configured to generate a plurality of first light beams extending parallel to the plane of movement,
   wherein the plurality of first light barriers are arranged such that the first light beams run in advance of the leading edge, and
   wherein the plurality of first light beams run with a plurality of different distances from the leading edge as viewed in the direction of the working movement,
   wherein the control unit is configured to stop the working movement of the first machine part in response to the first light barriers, and
   wherein the configuration device is configured to deactivate selected ones from the first light barriers for at least the duration of the working movement.

2. The safety apparatus according to claim 1, wherein the configuration device is configured in such a way that the first light barriers can be deactivated only in a reverse sequence of their distance from the leading edge.

3. The safety apparatus of claim 1, further comprising a plurality of second light barriers for generating second light grid which lies to one side of the plane of movement but essentially parallel thereto.

4. The safety apparatus according to claim 3, wherein the second light barriers are arranged to run with the first machine part during the working movement.

5. The safety apparatus of claim 3, wherein the configuration device is configured to deactivate selected ones from the second light barriers at least for the duration of the working movement.

6. The safety apparatus according to claim 5, wherein the configuration device is configured to deactivate only those second light barriers which run in advance of a non-deactivated first light barrier as viewed in the direction of the working movement.

7. The safety apparatus of claim 3, wherein the plurality of second light barriers includes at least one second light barrier that trails behind the leading edge as viewed in the direction of the working movement.

8. The safety apparatus of claim 1, comprising at least four first light barriers, the first light beams of which run at a distance of about 5 mm, about 9 mm, about 15 mm and about 21 mm from the leading edge.

9. The safety apparatus of claim 1, wherein the configuration device comprises a part for determining overtravel of the first machine part, with the configuration device further being configured to deactivate the first light barriers only as a function of the overtravel.

10. The safety apparatus of claim 1, wherein the configuration device is configured to deactivate the selected ones from the first light barriers permanently.

11. A machine installation for processing workpieces, the machine installation comprising:
   a first machine part and a second machine part, wherein the first machine part is adapted to perform a working movement towards the second machine part, and wherein the first machine part has a leading edge in the direction of the working movement, the leading edge defining a plane of movement,
   a plurality of first light barriers arranged for moving together with the first machine part during the working movement, wherein the first light barriers are designed to generate light beams that run parallel to the plane of movement and in advance of the leading edge such that each first light beam has a distance from the leading edge as viewed in the direction of the working movement, a control unit configured to stop the working movement in response to the first light beams, and a configuration device configured to deactivate selected ones from the first light barriers at least for the duration of the working movement.

12. The machine installation of claim 11, wherein the configuration device is configured in such a way that the first light barriers can be deactivated only in a reverse sequence of their distances from the leading edge.

13. The machine installation of claim 11, further comprising a plurality of second light barriers for generating second light beams, wherein the second light beams form a light grid lying to one side of the plane of movement but essentially parallel thereto.

14. The machine installation of claim 13, wherein the second light barriers are arranged to run with the first machine part during the working movement.

15. The machine installation of claim 13, wherein the configuration device is configurated to deactivate selected ones from the second light barriers for at least the duration of the working movement.

16. The machine installation of claim 15, wherein the configuration device is configured to deactivate only those second light barriers which run in advance of a non-deactivated first light barrier as viewed in the direction of the working movement.

17. The machine installation of claim 13, wherein the plurality of second light barriers includes at least one second light barrier that trails behind the leading edge as viewed in the direction of the working movement.

18. The machine installation of claim 11, comprising at least four first light barriers, the first light beams of which run at a distance of about 5 mm, about 9 mm, about 15 mm and about 21 mm from the leading edge.

19. The machine installation of claim 11, wherein the configuration device comprises a part for determining overtravel of the first machine part, with the configuration device further being configured to deactivate the first light barriers only as a function of the overtravel.

20. The machine installation of claim 11, wherein the first and the second machine part together comprise a punch and a die to form a press brake.

* * * * *

UNITED STATES PATENT AND TRADEMARK OFFICE
CERTIFICATE OF CORRECTION

| | |
|---|---|
| PATENT NO. | : 7,080,534 B2 |
| APPLICATION NO. | : 11/113422 |
| DATED | : July 25, 2006 |
| INVENTOR(S) | : Dirk Schneiderheinze |

It is certified that error appears in the above-identified patent and that said Letters Patent is hereby corrected as shown below:

Column 10,
Line 16, "according to" should be -- of --.
Line 19, "distance" should be -- distances --.
Line 21, after "light" (second occurrence) insert -- beams, wherein the second light beams form a light --.
Line 24, "according to" should be -- of --.
Line 31, "according to" should be -- of --.

Column 11,
Line 19, "configurated" should be -- configured --.

Signed and Sealed this

Twenty-fourth Day of October, 2006

JON W. DUDAS
*Director of the United States Patent and Trademark Office*